(12) United States Patent
Green et al.

(10) Patent No.: US 7,520,952 B1
(45) Date of Patent: Apr. 21, 2009

(54) ADHESIVE LIFTING MECHANISM

(75) Inventors: Joseph Green, Cape Coral, FL (US);
Michael Siemer, Orlando, FL (US);
Andrew Palmer, Orlando, FL (US)

(73) Assignee: Innovatime Dreams Corp., Cape Coral, FL (US)

(*) Notice: Subject to any disclaimer, the term of this patent is extended or adjusted under 35 U.S.C. 154(b) by 491 days.

(21) Appl. No.: 11/244,738

(22) Filed: Oct. 6, 2005

Related U.S. Application Data

(63) Continuation-in-part of application No. 10/966,089, filed on Oct. 15, 2004, now abandoned.

(51) Int. Cl.
*B32B 38/10* (2006.01)
(52) U.S. Cl. ............... 156/247; 156/241; 156/344; 156/574; 156/577; 156/584; 15/104.002
(58) Field of Classification Search ............... 156/238, 156/241, 247, 344, 540, 574, 577, 579, 584; 15/104.002; D19/67, 69
See application file for complete search history.

(56) References Cited

U.S. PATENT DOCUMENTS

| | | | |
|---|---|---|---|
| 2,851,008 A * | 9/1958 | Rochester | 15/210.1 |
| 3,889,310 A * | 6/1975 | Barouh et al. | 15/210.1 |
| 4,891,090 A * | 1/1990 | Lorincz et al. | 156/577 |
| D449,858 S * | 10/2001 | Liu | D19/69 |
| 6,321,815 B1 * | 11/2001 | You | 156/577 |
| 2004/0194895 A1* | 10/2004 | Steinberger | 156/574 |

\* cited by examiner

*Primary Examiner*—Mark A Osele
(74) *Attorney, Agent, or Firm*—William E. Noonan

(57) ABSTRACT

An adhesive lifting mechanism for retrieving retractable material from an underlying surface includes a housing having a retrieval opening. A tape spool, as well as applicator and, retrieval rollers, are mounted within the housing. The rollers have circumferential engagement surfaces that protrude through and outwardly from the retrieval opening. The rollers are engaged by successive segments of tape extending from the supply spool and across the retrieval opening. Each roller is positioned in the housing for being driven rotatably across an underlying surface with the peripheries of the respective rollers simultaneously bearing against the underlying surface such that a first segment of tape lifts extractable matter from the underlying surface and is retrieved into the housing. A fresh, second segment of tape from the supply spool is then pulled across the opening and peripherally engaged with the applicator roller.

10 Claims, 8 Drawing Sheets

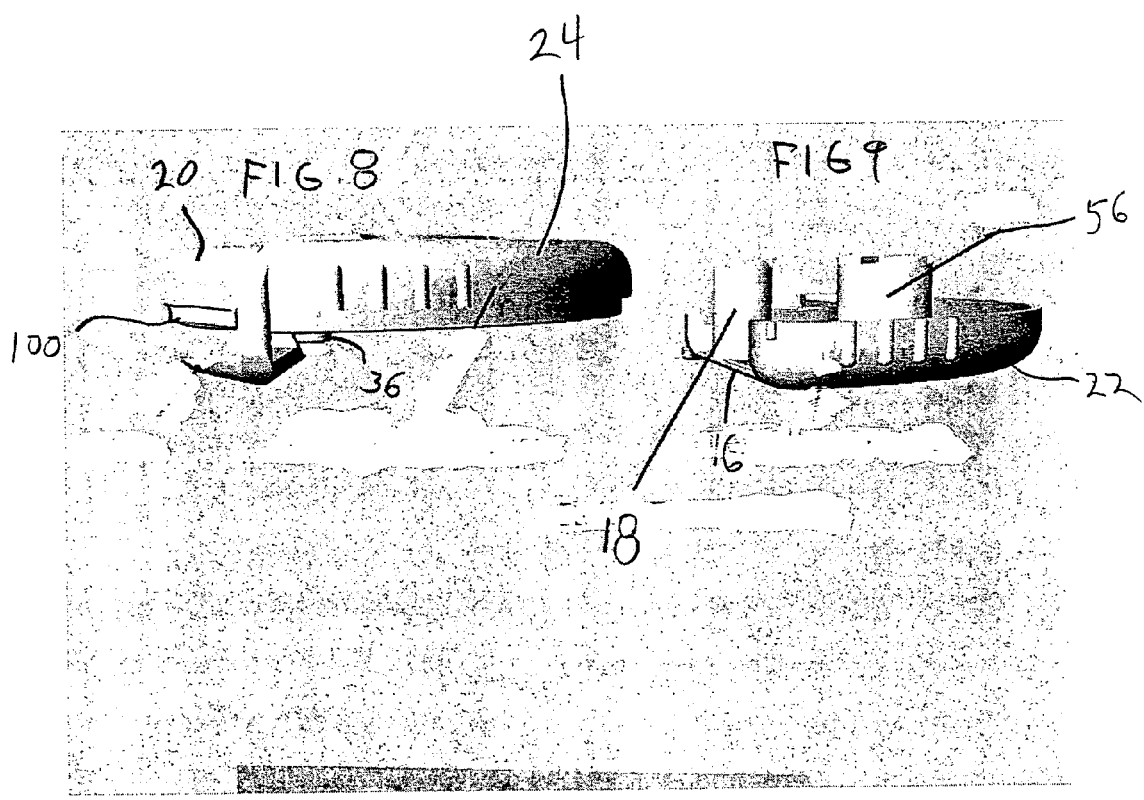

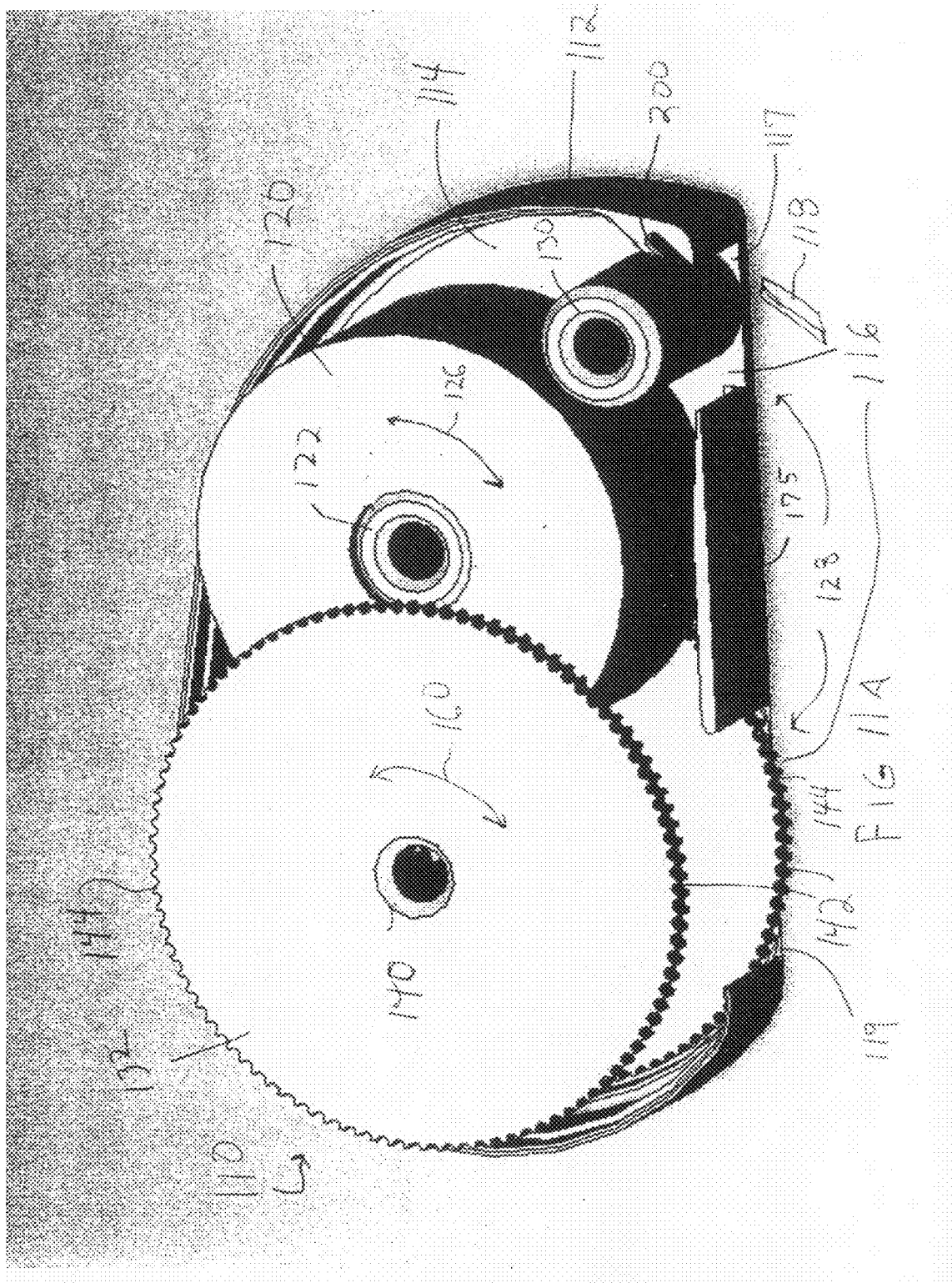

ADHESIVE LIFTING MECHANISM

RELATED APPLICATION

This application is a continuation in part of U.S. patent application Ser. No. 10/966,089 filed Oct. 15, 2004 now abandoned.

FIELD OF THE INVENTION

This invention relates to a handheld device for removing and lifting extractible material from an underlying surface. The device is particularly effective for removing protective coating that covers the hidden indicia printed on lottery tickets and other types of gaming tickets.

BACKGROUND OF THE INVENTION

Numerous governmental and private entities produce and sell scratch-off gaming tickets. State lottery tickets are a particularly popular form of scratch-off ticket. These tickets usually employ a protective coating of latex, which covers hidden numbers, symbols or other types of indicia printed on a substrate of the ticket. The player who purchases the ticket usually uses his or her fingernail or a thin/sharp object such as a coin or paperclip to scratch away the latex so that the hidden indicia are revealed. This normal technique for removing the latex from the substrate is messy, tedious and time consuming. Quite often, latex residue is deposited on the user's hands, fingernails and/or clothing. In some cases, a coin, paperclip or other sharp/thin item is unavailable. This can be frustrating, particularly for a player who is anxious to read the hidden material on the ticket.

Recently, the security surrounding lottery and gaming tickets has increased. It has become more difficult to circumvent the protective coating on the tickets. An improved technique for removing and disposing of the latex coating is required; however, it is still usually necessary to physically scratch-off the coating before it is removed.

A compact and easy to use, handheld device would greatly facilitate removal and disposal of latex coating from a lottery ticket. To date, no such device is available for that purpose. In addition, such a handheld device could used for other applications including the removal of lint, dirt, animal hair, etc. from clothing, upholstery, rugs, etc. A need exists for a device of this type which is extremely compact, easy to use without creating a mess and readily disposable.

SUMMARY OF THE INVENTION

It is therefore an object of the present invention to provide an adhesive lifting mechanism that is much more compact than existing tape mechanisms and which employs the unique overlapping footprint that allows the device to be especially compact.

It is a further object of this invention to provide a device that eliminates the mess associated with standard techniques for scratching the latex from a gaming ticket and which particularly collects and holds the latex immediately after it has been removed.

It is a further object of this invention to provide a device that allows the protective coating on a lottery or other gaming ticket to be removed quickly, effortlessly and with little or no tedium or inconvenience.

It is a further object of this invention to provide a device for removing the protective coating from a lottery gaming ticket that is simple and fun to use and which may be employed for a large number of tickets.

It is a further object of this invention to provide a device for removing the protective coating from a gaming ticket that provides a new and marketable novelty item for the lottery and gaming industries.

It is a further object of this invention to provide a device for effectively lifting and disposing of various extractable items such as lint, dirt and animal hair found on clothing, upholstery and rugs.

This invention features an adhesive lifting mechanism that is particularly effective for removing the protective coating that covers the hidden indicia printed on the substrate of a game ticket. The device includes a supply of tape carrying on one side a permanent, nontransfer adhesive that is adherable to and capable of lifting the protective coating. There is a housing having an interior chamber and an application opening communicating with the interior chamber. A tape supply spool is mounted rotatably within the interior chamber for mounting the supply of tape thereon. A tape retrieval roller is mounted rotatably within the interior chamber for collecting tape from the supply spool. An applicator roller is mounted rotatably to the housing proximate the application opening. The tape extends from the supply spool and across the application opening where it engages the applicator roller peripherally. The applicator roller and peripherally engaged tape are applied to the protective coating of the game ticket and the applicator roller is rotated through movement of the housing such that a first segment of tape removes the protective coating to reveal the hidden indicia and is pulled toward the roller. At the same time, a fresh second segment of tape from the supply spool is pulled into peripheral engagement with the applicator roller proximate the application opening. The device can then be used in a similar manner to remove the protective covering from the hidden indicia on another ticket.

In one preferred embodiment, the roller and the applicator roller constitute a single roller upon which successive first segments of tape are wound. Each spool and roller may include a clutch mechanism for restricting rotation of the spool to a single direction. The clutch mechanism may include a ratchet element carried by the spool and a complementary ratchet element mounted in the housing. A closure may be attached to the housing for selectively closing the application opening. The closure may carry a projection for manually removing the protective coating from a game ticket.

In an alternative preferred embodiment of this invention, there are separate and distinct applicator and retrieval rollers. The tape extends from the supply spool, peripherally engages the applicator rollers and is windable on the retrieval roller. The retrieval roller may include at least one circumferentially toothed wheel for circumferentially bearing against the underlying surface and rotating to pull the tape peripherally across the applicator roller. A scraper may be attached to and extend outwardly from the housing adjacent the retrieval opening. The successive segments of tape pass between the applicator roller and the scraper.

The retrieval roller and the tape supply spool are preferably noncontiguous and rotatably interengaged exclusively by the adhesive tape. The tape supply spool and the retrieval roller may define overlapping footprints. The footprint of the roller diametrically expands as successive segments of tape are retrieved thereon such that the retrieved tape diametrically overlaps the footprint of the spool.

The lifting mechanism may also be used to remove extractable items such as lint, dirt and animal hair from an underlying surface comprising clothing, upholstery, rugs or the like.

DETAILED DESCRIPTION OF PREFERRED EMBODIMENTS

Other objects, features and advantages will occur from the following description of a preferred embodiment and the accompanying drawings, in which:

FIG. 8 is an elevational side exterior view of the second half of the housing;

FIG. 9 is an elevational side exterior view of the first half of the housing;

FIG. 11A is a perspective view of the device of FIG. 11 with the top of the housing removed to depict the components of the device.

Figure 1:
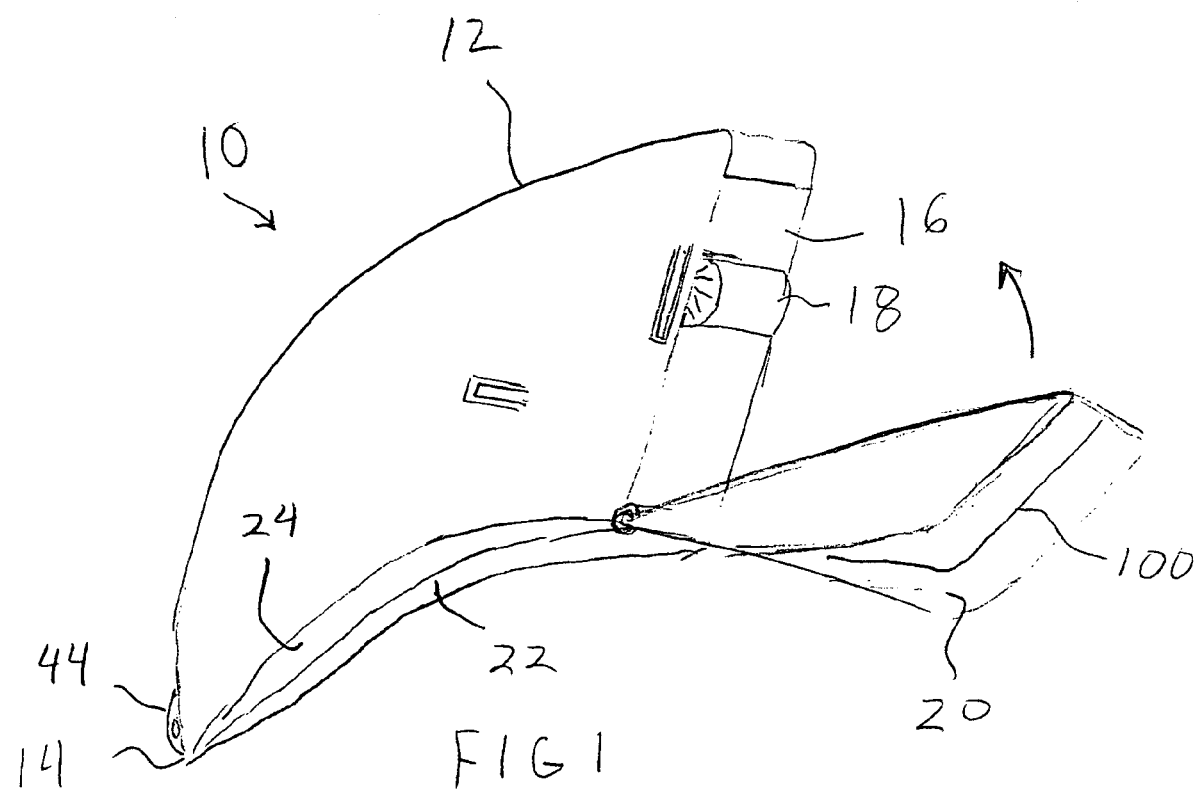
FIG. 1 is a perspective view of an adhesive lifting mechanism and in particular a device for removing the protective coating of a game ticket in accordance with this invention.

There is shown in FIG. 1 a device 10 for stripping or lifting the protective coating that conventionally covers or obscures the hidden indicia printed on the substrate of a lottery ticket or other type of game ticket. It should be understood that device 10 may be used in connection with virtually any type of gaming ticket. The protective coating traditionally comprises latex, although the invention should be deemed to cover alternative types of protective coatings. Such coatings cover a paper or plastic substrate that bears numbers, letters, characters, designs or other types of hidden indicia.

Device 10 includes a housing 12 that preferably has a size and shape that allows it to fit conveniently and compactly in the user's hand. Housing 12 is preferably composed of a durable molded plastic, although the precise composition is not a limitation of this invention. The housing is shaped to fit comfortably in the user's hand. A first end 14 of the housing tapers to a point. The opposite end includes an elongate application opening 16 that exposes the interior of housing 12. An applicator roller 18 is mounted rotatably within the housing proximate opening 16. More particularly, a portion of roller 18 projects beyond the edge of opening 16. Operation of the applicator roller is described more fully below. A closure 20 is hingedly attached to the housing for selectively covering opening 16.

As shown more clearly in FIGS. 2, 3, 5, 6 and 7-9, housing 12 preferably comprises a pair of first and second half sections 22 and 24 that conform to one another and are snap-fit together by various suitable means. Each of the half sections includes a modified or truncated crescent or teardrop shape. A peripheral lip 26 extends largely about section 22. Likewise, a peripheral lip 28 extends about most of section 24. The forward edges 29 and 30 of sections 22 and 24, respectively, do not include a lip. As a result, when the sections are interconnected, opening 16 is formed in the manner shown in FIG. 1.

Figure 2:
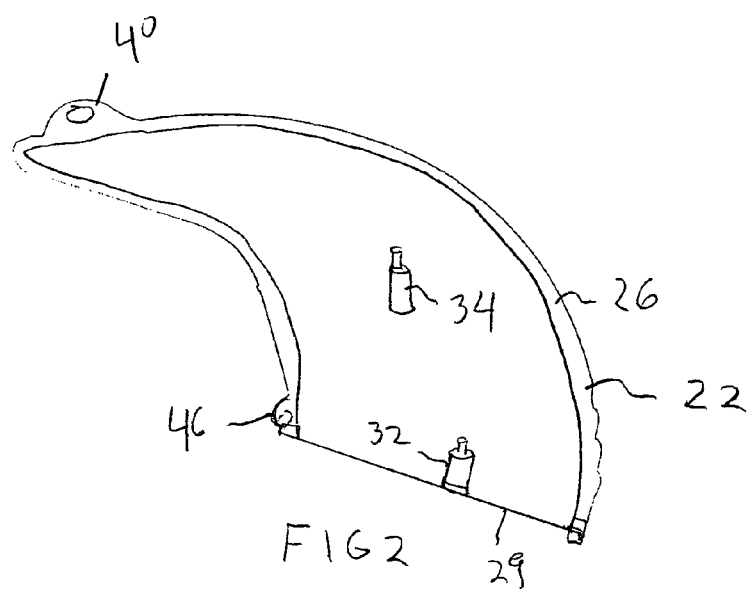
FIG. 2 is a perspective interior view of a first half of the housing.
Figure 3:
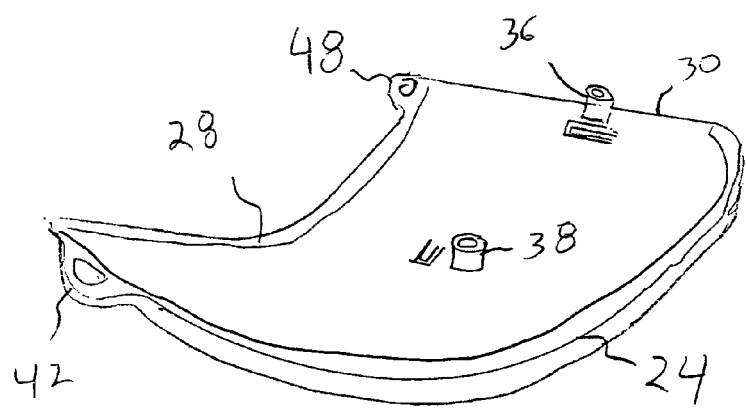
FIG. 3 is a perspective interior view of the other half of the housing.

A representative manner for snap-fitting the housing sections together is depicted in FIGS. 2 and 3. More particularly, section 22 carried a pair of male spindles 32 and 34. Section 24 similarly carries a pair of female spindles 36 and 38 that are positioned in corresponding locations in the interior of section 24. To interconnect the half sections of the housing 12, sections 22 and 24 are placed together along their respective peripheral edges 26 and 28. Spindles 32 and 34 are then inserted into the central openings of female spindles 36 and 38 respectively. The half sections are snap-connected together such that the assembled housing is formed in the manner shown in FIG. 1. In addition, half sections 22 and 24 include respective key chain slot-forming segments 40 and 42. When the half sections are interconnected in the above-described manner, a fully completed key chain-accommodating slot 44 is formed in the manner shown in FIG. 1.

Figure 4:
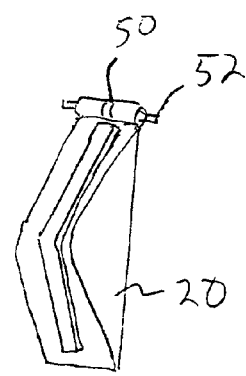
FIG. 4 is a perspective view of the closure.

Likewise, when the half sections are connected together, respective hinge receptacles 46 and 48 are aligned. These receptacles allow closure 20 to be hingedly attached to the assembled housing. In particular, as shown in FIG. 4, closure 20 includes a hinge bushing 50 that accommodates a hinge pin 52. The ends of hinge pin 52 are received in respective receptacles 46 and 48 to hingedly attach the closure to the housing in the manner shown in FIG. 1.

Figure 5:
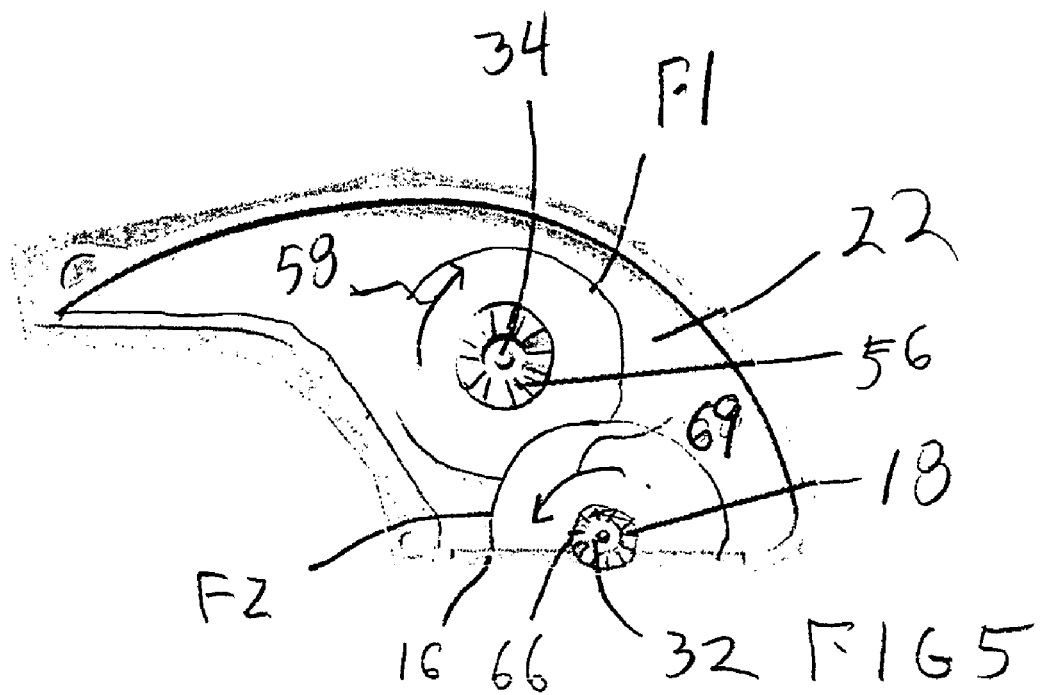
FIG. 5 is an elevational view of the interior of the housing that illustrates the tape supply spool and combined application roller.
Figure 6:
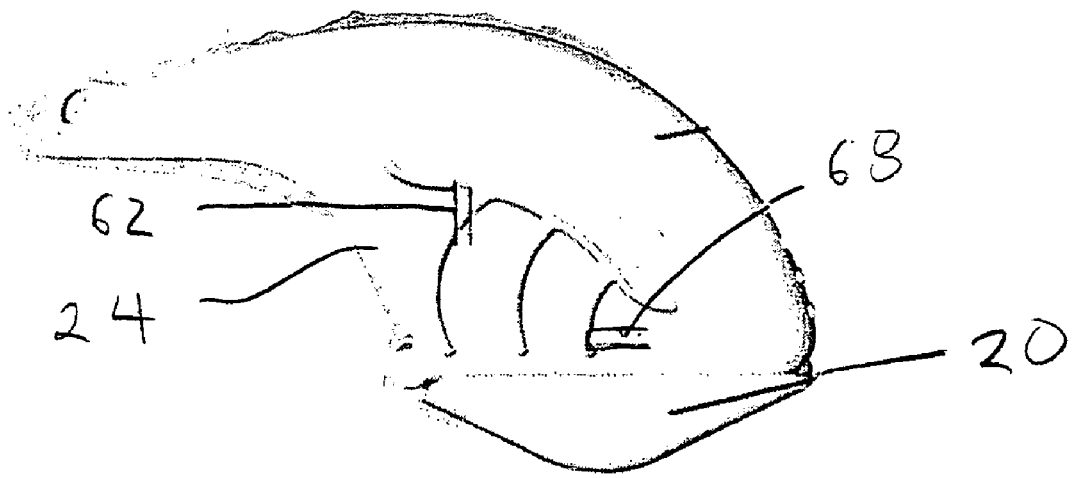
FIG. 6 is an elevational view of the exterior of the opposite side of the housing.
Figure 7:
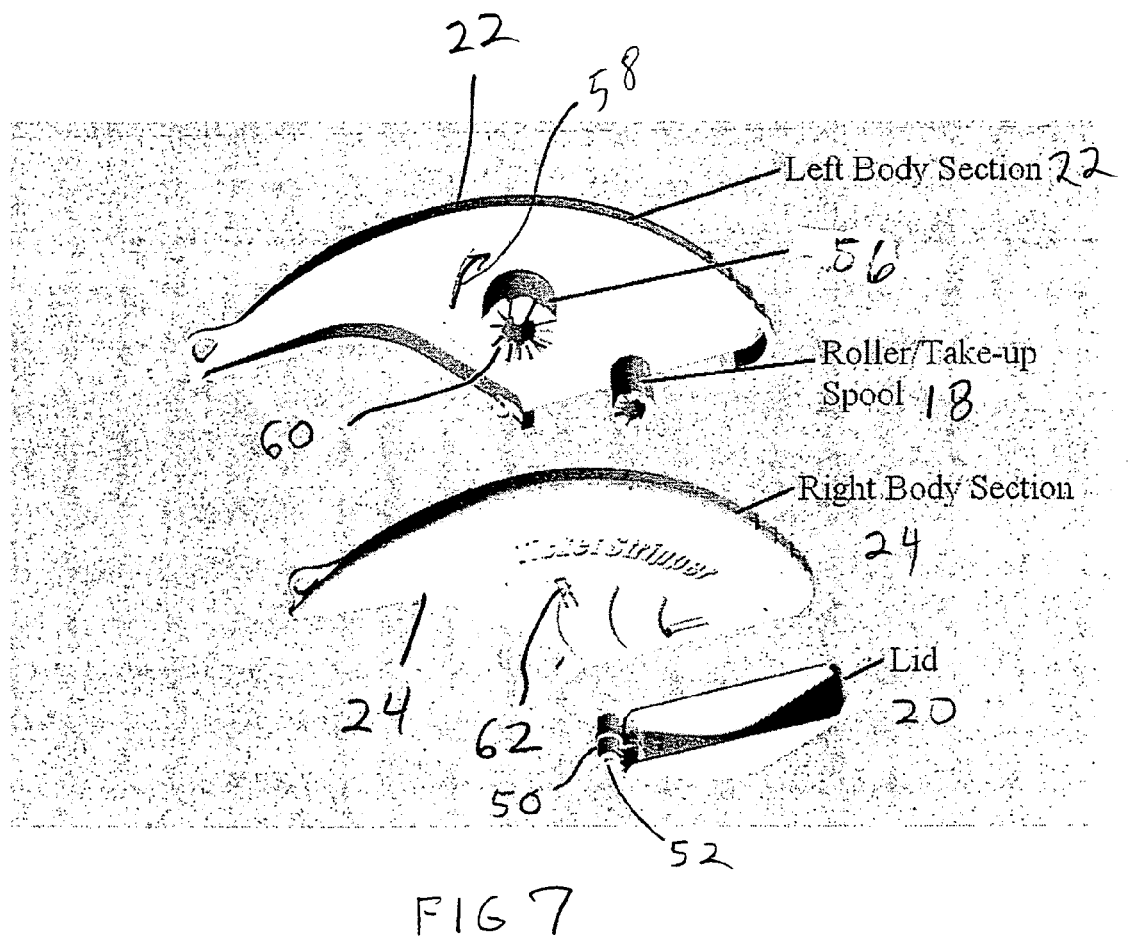
FIG. 7 is an exploded view of the device.

A tape supply spool 56 is mounted rotatably within housing 12. In particular, as shown in FIGS. 5, 7 and 9, tape supply spool 56 includes a cylindrical component that is mounted rotatably about male spindle 34. Indeed, when spindle 34 is snap-fit into female spindle 38, tape supply spool 56 is rotatably mounted upon the interconnected male and female spindles. Spool 56 is intended to accommodate a wound roll of adhesive tape. Various known and yet to be developed adhesives may be employed. Typically, the adhesive is carried on only one side (i.e. the inside surface) of the tape. The adhesive is permanently attached to the inside surface and is not a transferred adhesive. This is critical because the mechanism of this invention is intended for lifting or retrieving protective coatings or other extractable matter. The adhesive is not deposited from the device onto another object in the manner of a transfer adhesive.

A clutch mechanism is employed to restrict rotation of spool 56 in one direction, i.e. in the direction of arrow 58, FIG. 7. In particular, the clutch mechanism includes an annular ratchet element 60 carried by the upper end of spool 56. A complementary ratchet element 62 comprises a finger or detent integrally formed in housing section 24 by a suitable plastic punch-out process. In particular, detent 62 flexes interiorly and ratchet element 60 includes a plurality of radial teeth that are cut such that they interengage detent 62. As spool 56 is rotated in the direction of arrow 58, the cut of the teeth allow the teeth to rotate past inwardly flexed detent 62. Alternatively, the cut and orientation of the teeth cause the teeth to lock with detent 62 and prevent rotation of spool 56 in the opposite direction.

As previously described, an applicator roller 18 is mounted rotatably proximate entrance 16. This roller functions to apply pressure to the tape against the gaming ticket. It also serves as a roller for the tape. It should be noted that when the device is used in accordance with this invention, roller 18 also serves as a tape roller. This operation is described more fully below. Roller 18 is mounted within housing 12 in a manner analogous to that of spool 56. In particular, as best shown in FIG. 5, roller 18 comprises an annular or cylindrical element that is mounted rotatably on male spindle 32. When the half section 22 and 24 of housing 12 are interconnected, roller 18 is effectively rotatably mounted on interconnected spindles 32 and 38. FIG. 5 clearly depicts that approximately one-half of roller 18 is exposed through entrance 16.

Roller 18 includes a clutch mechanism that is analogous to that employed by spool 56. In particular, one end of roller 18 includes a toothed ratchet element 66 that is interengaged with a inwardly flexing detent 68 formed integrally in housing section 24. As with spool 56, when roller 18 rotates in the direction of arrow 69, detent 68 allows such rotation. However, the detent locks with the teeth and prevents roller 18 from rotating in the opposite direction. This clutch structure therefore provides for one-way motion of both the tape supply spool and the application roller 18.

Figure 10:
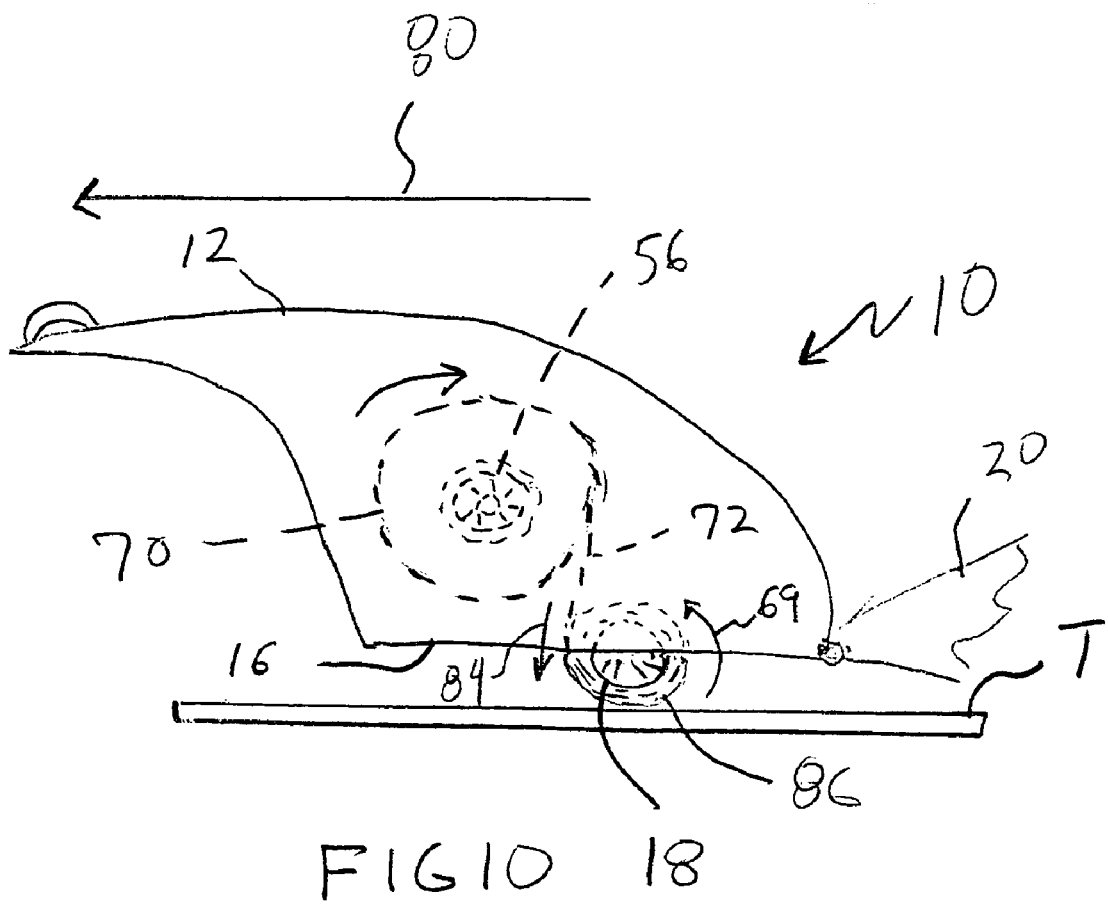
FIG. 10 is an elevational side view of the device being operated to remove the protective coating from a lottery or other game ticket.

FIG. 10 illustrates device 10 being used to strip of lift the latex protective covering from the substrate of a gaming ticket T. As shown partially in phantom, tape supply spool 56 carries an annular supply (i.e. roll) of adhesive tape 70. The leading end of the adhesive tape is pulled from roll 70 and is engaged peripherally with applicator roller 18, which extends partially below entrance 16 of device 10. Tape 72 is deployed from roll 70 and wound onto applicator roller 18 such that the outer, non-adhesive surface of tape 72 peripherally engages the circumference of roller 18. As a result, the inner adhesive surface of tape 72 is exposed peripherally about roller 18. To operate device 10, the user grasps housing 12 and positions the device such that entrance 16 and partially exposed roller 18 are pointed toward the upper surface of ticket T. The peripheral surface of roller 18 and the tape that it carries are engaged with or applied against the protective coating of ticket T and housing 12 is pulled rearwardly as indicated by arrow 80. This causes the adhesive outer surface of the tape to lift the protective coating and reveal the hidden indicia on the substrate of ticket T. A first segment of exposed adhesive tape surface collects the latex or other protective coating and transports that latex into the housing as indicated by arrow 69. A successive second segment of tape is pulled downwardly from roll 70 as indicated by arrow 84, and is positioned on the periphery of applicator roller 18 and the roll of used tape that it has collected circumferentially thereon. Essentially, as device 10 is operated, tape 72 is pulled from roll 70 on and is collected onto applicator roller 18, which effectively forms a roller for the tape. Gradually, the size of the collected roll of tape 86 proportionally increases as the size of supply roll 70 decreases. Eventually, after a number of applications, the supply of tape is exhausted. The tape may then be replaced or the entire device discarded and replaced.

As best shown in FIG. 5, the supply spool includes a footprint F1 that overlaps the footprint F2 of applicator roller 18. These overlapping footprints are configured to make the device as compact as possible. Initially, when the supply roll 70 is full, it will overlap footprint F2. Gradually, as the protective coating is removed from more tickets, the size of the roll of tape 86 on the roller will increase and that roll will overlap F1. By the time that occurs, the size of the supply roll will be small enough to accommodate the overlap of the retrieval roll.

Closure 20 carries a rib or projection 100 that extends along the apex of closure 20. In the event the user runs out of tape, the elongate rib 20 may be placed against the protective coating and used to manually scratch that coating in a manner similar to a coin, paperclip, etc.

It is important that the tape supply spool and the retrieval roller be operably (i.e. rotatably) interengaged only by the tape interconnected between those components. Otherwise, the roller and the spool are not interconnected by gears are otherwise and do not touch. This allows each of the roller and the spool to rotate freely within the housing so that improved, binding-free operation is achieved.

Various modifications may be made to device 10 within the scope of this invention. For example, the applicator roller may be constructed separately from the roller. Other types of clutch mechanisms such as intermeshing gears may be used to limit operation of the rollers to one direction each.

The mechanism may also be used for a variety of other lifting and extracting operations. For example, the tape may be applied to drapes, upholstery, clothing, rugs, etc. to remove lint, dirt, animal hair and other debris. The device is operated in a manner analogous to that previously described. During each operation, the tape is rolled across the underlying surface and loose or other extractable material is removed and retrieved within the housing on the retrieval spool. When the tape is depleted, it may be replaced by a new spool of tape or by an entirely new lifting apparatus.

Figure 11:
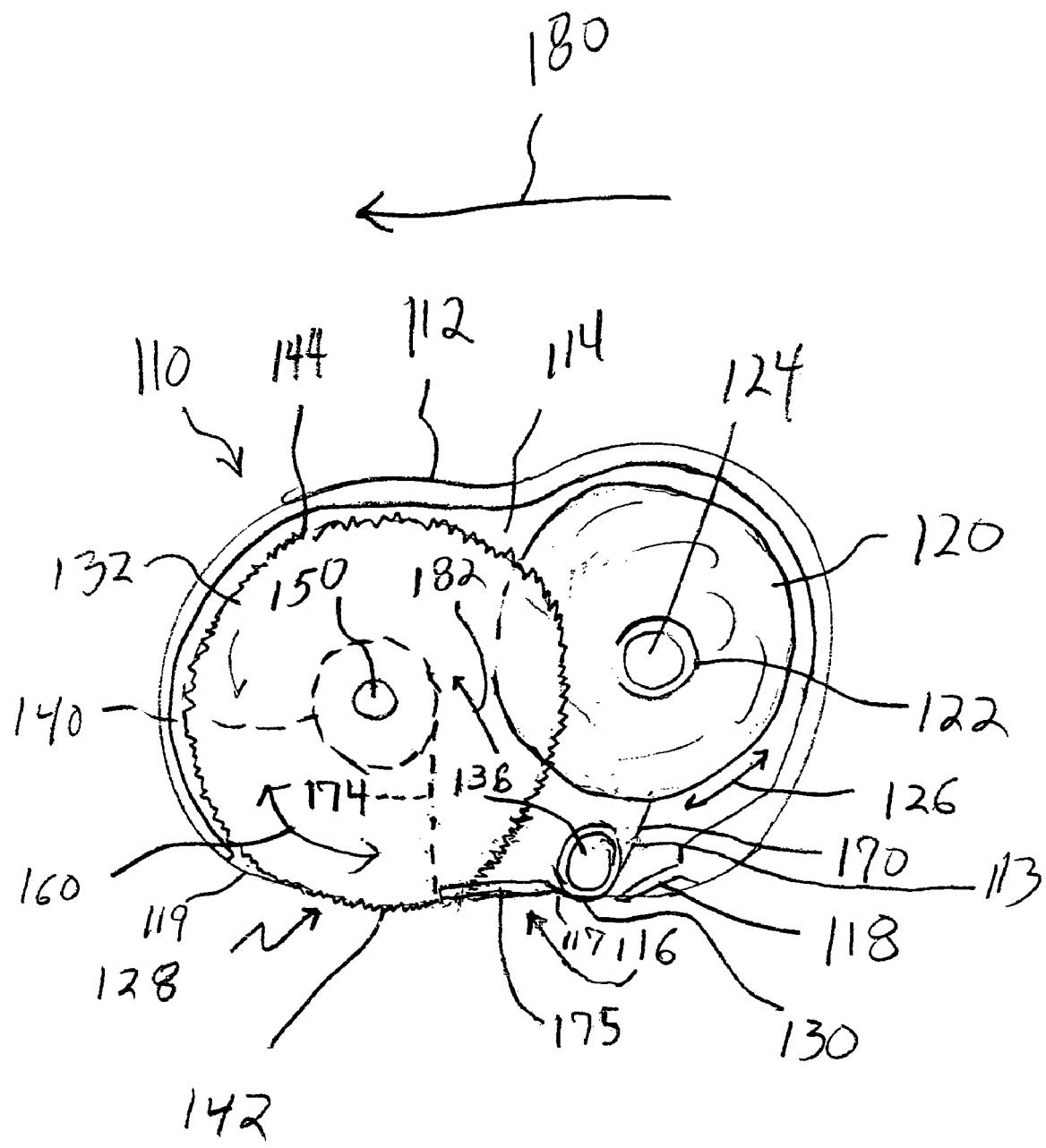
FIG. 11 is a side elevational view an alternative preferred adhesive lifting device in accordance with this invention.

An alternative version of the invention is shown in FIGS. 11 and 11A. As depicted therein, mechanism 110 includes a housing 112 that is composed of a molded plastic. Typically, the housing includes two interconnected half segments. One of the half segments is removed for clarity and to illustrate the internal components of the lifting mechanism.

Housing 112 includes an interior chamber 114. A retrieval opening 116 comprising opening portions 117 and 119 separated by an applicator plate 175 is formed in the bottom of the housing in communication with chamber 114. A scraper 118 is attached to housing 112 and extends through opening 116.

A wound supply of adhesive tape 120 is rotatably mounted within chamber 114. More particularly, tape 120 is wound on a supply spool 122 that is disposed rotatably about a post or spindle 124. The post may comprise one or multiple pieces that are attached to the inside walls of housing 112 as in the prior embodiment. Tape supply 120 is rotatable about post 124 as indicated by doubleheaded arrow 126. The tape carries a permanent, nontransfer adhesive on its inside surface 113 (FIG. 11).

An applicator and retrieval assembly 128 includes an applicator roller 130 and a tape retrieval roller 132. Applicator roller 130 is rotatably mounted within housing 112 on a shaft 136, which again may comprise one or multiple pieces. Typically, the shaft is molded unitarily with the housing. Roller 130 is disposed proximate opening 116 and is closely adjacent to and slightly above scraper 118. By the same token, roller 132 includes a central spindle 140 that axially interconnects a pair of wheels 142. Each of the wheels (only one of which is shown) has a toothed circumferential surface 144 that protrudes through portion 119 of retrieval opening 116. Spindle 140 is mounted on a shaft 150 that again is interconnected to the inside walls and extends laterally across chamber 114 of housing 112. As with tape spool 122, roller 132 rotates within the housing chamber as indicated by doubleheaded arrow 160.

Successive segments of tape 120 extend between the tape supply on spool 122 and the applicator and retrieval assembly 128. In particular, a tape segment 170 extends from tape supply 120 to roller 130, and between roller 130 and scraper 118. The tape peripherally engages roller 130 and a leading tape segment 174 extends from roller 130 beneath applicator plate 175 and to spindle 140 of retrieval roller 132.

In operation, mechanism 110 is manually grasped and placed over the "scratch-off" coating of a lottery or gaming ticket. The mechanism is then rolled by hand across the ticket in the direction of arrow 180. The toothed circumferences 144 of wheels 142 engage the underlying substrate of the ticket and/or surrounding surface and pull successive tape segments 174 and 170 across the applicator roller and in the direction of arrow 182. As a result, the tape is progressively unwound from spool 122 and wound onto spindle 140 of retrieval roller 132. Roller 130 bears against the outer surface of tape 120 as it is pulled from spool 122. Specifically, the tape is pulled peripherally about roller 130 such that tape spool 122 rotates in a counterclockwise direction. The roller 130 presses against the peripherally engaged tape segment. At the same time, moving device 110 in the direction of arrow 180 causes the leading edge of scraper 118 to scrape and remove the latex protective coating from the ticket. The leading edge of the scraper is in close proximity to roller 130 and the particular tape segment 174, 170 passing between the roller and the scraper. As a result, the extracted latex covering is adhesively collected by the inside surface of the exposed tape. As the tape segment collecting the coating is pulled about roller 130, the applicator roller rotates in a counterclockwise direction. The retrieval roller 132 is likewise driven in a counterclockwise direction such that the leading tape segment 178 and the coating collected thereon is pulled onto the retrieval spindle 140. The scraped latex is thereby picked up by the adhesive tape and transferred neatly onto the retrieval roller. A fresh successive section of tape 170 is then pulled from the tape supply spool into the position peripherally engaging roller 130 and previously occupied by tape segment 174. The scraping and retrieval operation may then be repeated as often as required. Eventually, when the supply of tape is exhausted, the lifting apparatus may be discarded. Alternatively, a fresh supply of tape may be installed.

It should be understood that the version shown in FIGS. 11 and 11A may also include ratchet mechanisms identical or analogous to those previously described, which limit the turning of the spools and rollers to one direction (i.e. counterclockwise). As in the prior embodiment, the only rotatable interengagement between the tape supply spool and the retrieval roller is the tape itself. Otherwise, these components are not contiguous and are not connected by gears or other mechanisms.

As in the prior embodiment, tape supply spool 122 and retrieval roller 132 define overlapping footprints. As a size of the tape 120 on the supply spool decreases, the amount of tape retrieved on roller 132 increases. Eventually, the retrieved tape diametrically expands to an extent that it is accommodated within the original footprint of the supply spool.

The version in FIG. 11 allows the adhesive lifting apparatus to be used successively in connection with newer lottery tickets featuring enhanced security protection. The adhesive on such tickets must first be scraped before it is adhesively removed. Scraper 118 is disposed in close proximity to applicator roller 130 so that the scraped latex is picked up completely and quickly by the tape. This is done quickly and conveniently without creating a mess.

In certain versions of the invention, only a single toothed wheel may be employed. The diameters of the spool and rollers may be varied within the scope of the invention. In some cases (FIG. 11A), the scraper may be inserted into a slot 200 formed in the housing. In other cases, the scraper may be formed unitarily with the housing. The retrieval roller may alternatively employ a circumferential surface carrying rubber or similar material for frictionally engaging the underlying surface.

From the foregoing it may be seen that the apparatus of this invention provides for a handheld lifting mechanism for removing and retrieving the protective coating that covers hidden indicia of lottery tickets and other types of gaming tickets. A version of the mechanism may also be used for collecting extractable material from underlying fabric surfaces. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. An adhesive lifting mechanism for retrieving protective coating from the substrate of a gaming ticket, said mechanism comprising:

a housing having an interior chamber and a retrieval opening communicating with said chamber;

a scraper attached to and extending outwardly from said housing adjacent to said retrieval opening;

a tape supply spool mounted rotatably within said chamber for supporting a wound supply of adhesive tape thereon, said tape carrying a permanent, nontransfer adhesive on an inner surface thereof; and an applicator and retrieval assembly including an applicator roller and a separate and distinct retrieval roller both rollers being mounted rotatably within said chamber, said tape extending from said supply spool, peripherally engaging said applicator roller and being windable onto said retrieval roller, each roller having a circumferential engagement surface that protrudes through and outwardly of said retrieval opening and each roller being engaged by successive segments of said tape that extend from said tape supply spool and across said retrieval opening, each roller being positioned in said housing for being driven rotatably across an underlying surface with the peripheries of said rollers bearing simultaneously against the substrate and successive segments of said tape passing between said applicator roller and said scraper, such that said scraper removes the protective coating from substrate and a first segment of said tape lifts the removed coating from the substrate and is retrieved into the housing and onto the retrieval roller, and a fresh, second segment of tape from said supply spool is pulled across said retrieval opening and into peripheral engagement with said applicator roller.

2. The apparatus of claim 1 in which said retrieval roller includes a spindle for retrieving successive segments of said tape thereon and a wheel connected to said spindle for carrying a circumferential engagement surface of said retrieval roller.

3. The apparatus of claim 1 in which said retrieval opening includes a pair of opening portions separated by an applicator plate, said applicator roller and said scraper extending through one of said opening portions and said retrieval roller extending through the other opening portion.

4. An adhesive lifting mechanism for retrieving extractable material from an underlying surface, said mechanism comprising:

a housing having an interior chamber and a retrieval opening communicating with said chamber;

a tape supply spool mounted rotatably within said chamber for supporting a wound supply of adhesive tape thereon, said tape carrying a permanent, non-transfer tape on an inside surface thereof; and an applicator and retrieval assembly including an applicator roller and a separate and distinct retrieval roller mounted rotatably within said chamber, said tape extending from said tape supply spool, peripherally engaging said applicator roller and being windable upon said retrieval roller, each of said applicator roller and said retrieval roller having a circumferential engagement surface that protrudes through and outwardly of said retrieval opening and each said roller being engaged by successive segments of tape that extend from said tape supply spool and across said retrieval opening, said rollers being positioned in said housing for being driven rotatably across an underlying surface with the peripheries of said rollers bearing simultaneously against the underlying surface such that a first segment of tape lifts extractable matter from the underlying surface and is retrieved into said housing, and a fresh, second segment of tape from said tape supply spool is pulled across said retrieval opening and into engagement with said circumferential engagement surface of said applicator roller.

5. The mechanism of claim 4 in which said tape supply spool and said retrieval roller define overlapping footprints, the footprint of said retrieval roller diametrically expanding as successive segments of tape are retrieved thereon such that the retrieval tape diametrically overlaps the footprint of said spool.

6. The mechanism of claim 4 in which said retrieval roller includes at least one circumferentially toothed wheel for circumferentially bearing against the underlying surface and rotating to pull tape peripherally across said applicator roller.

7. The mechanism of claim 6 further including a scraper attached to and extending outwardly from said housing adjacent said retrieval opening, said successive segments of tape passing between said applicator roller and said scraper.

8. The mechanism of claim 4 in which said retrieval roller includes a pair of toothed wheels axially joined by a spindle and for bearing circumferentially against the underlying surface through said opening and rotating to pull tape across said applicator roller and onto said spindle of said retrieval roller.

9. The mechanism of claim 8 further including a scraper attached to and extending outwardly from said housing adjacent said retrieval opening, said successive segments of tape passing between said applicator roller and said scraper.

10. A method for retrieving extractable material from an underlying surface, said method comprising:
providing an adhesive lifting mechanism that includes a housing having an interior chamber and a retrieval opening communicating with the chamber, a tape supply spool mounted rotatably within the chamber for supporting wound supply of adhesive tape thereon, the tape carrying a permanent, nontransfer tape on an inside surface thereof and an applicator and retrieval assembly including an applicator roller and a separate and distinct retrieval roller mounted rotatably within the chamber, the tape extending from the tape supply spool, peripherally engaging the applicator roller and being windable upon the retrieval roller, each of the applicator roller and the retrieval roller having a circumferential engagement surface that protrudes through and outwardly of the retrieval opening; and
simultaneously driving said rollers rotatably across the underlying surface with the peripheries of said rollers bearing simultaneously against the underlying surface such that a first segment of tape lifts extractable matter from the underlying surface and is retrieved into said housing upon said retrieval roller, and a fresh, second segment of tape from said tape supply spool is pulled across said retrieval opening and into engagement with said circumferential engagement surface of said applicator roller.

* * * * *